July 19, 1938.  K. TESSKY  2,124,216
LATHE
Filed June 1, 1937  2 Sheets-Sheet 1
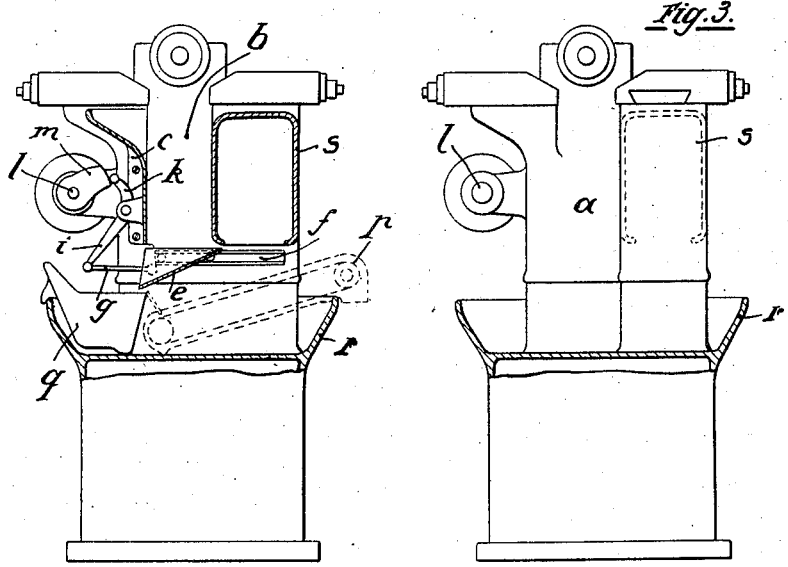
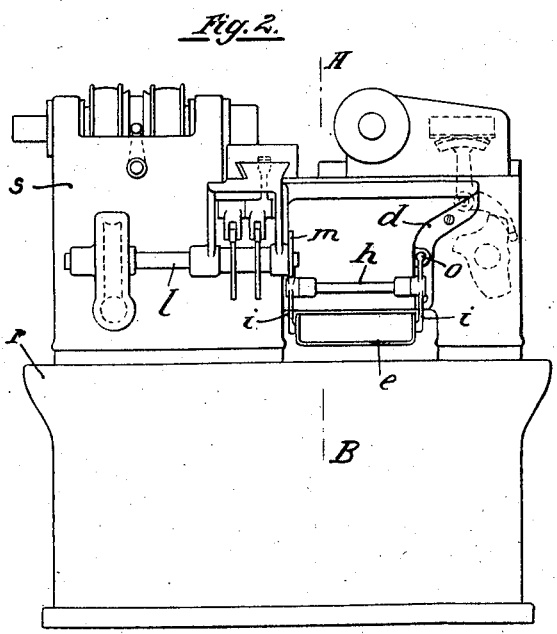
Inventor:
Karl Tessky July 19, 1938.  K. TESSKY  2,124,216

LATHE

Filed June 1, 1937  2 Sheets-Sheet 2

Inventor:
Karl Tessky

Patented July 19, 1938

2,124,216

UNITED STATES PATENT OFFICE 2,124,216

LATHE

Karl Tessky, Esslingen-on-the-Necker, Germany

Application June 1, 1937, Serial No. 145,831
In Germany July 3, 1936

2 Claims. (Cl. 29—44)

My invention relates to automatic lathes and has for one of its objects to provide means, whereby an automatic lathe can be changed in a simple and efficient manner so as to enable it to operate on metals of different physical properties.

In the construction of automatic one-spindle lathes the bed has hitherto been designed differently in accordance with the shape and quantity of cuttings formed during operation. When turning brass, steel and the like furnishing cuttings of small or medium length, a "closed" design is favored as a rule, in which the cuttings are conducted towards the trough on the underframe through a hollow guideway or shaft combined with a cutting tray. As a rule in lathes of this type, shortly before the workpiece is cut off and before the cutting work has come to an end, an oscillating or reciprocating workpiece chute is automatically placed in front of the bottom end of this shaft, this chute serving for guiding the cut-off workpiece into the workpiece box which is as a rule placed, for ready removal, in the trough, in order to thus separate the cuttings from the finished workpieces in a simple manner.

On the other hand, whenever tough material such as tough steel, copper, aluminium and the like are acted upon, the long cuttings will not drop through the shaft, but stay on the top plate of the lathes and must be constantly removed in order to prevent disturbances in the operation of the lathe.

Therefore nowadays lathes with an open bed, i. e. lacking a shaft, have been designed, in which the cuttings can drop freely, however, in that case the finished workpieces, which also drop down with the cuttings, must be separated from the cuttings by hand.

Apart therefrom such lathes frequently also operate on material yielding cuttings of small or medium length, which would also make it very desirable to guide the workpieces separately.

My invention is intended to avoid the necessity of producing two different types of lathes, which differ in regard to the main part, the lathe bed.

According to this invention I succeed by very simple means in designing a lathe in a manner whereby it is fit for use in all these cases, being readily changeable from one to another use.

I attain this by designing the lathes with an open body, i. e. without a shaft, and adding an element, which can easily be fitted on the lathe and removed again and which, when fitted on, forms a shaft, at the same time providing a workpiece chute and means for operating it.

When operating on material yielding cuttings of greater length, this supplement is removed and the cuttings and workpieces simply drop into the trough. When operating on material yielding cuttings of small or medium length, the supplement is fitted on and the cuttings now drop through the shaft formed by the removable element.

In the drawings affixed to this specification and forming part thereof, a lathe embodying my invention is illustrated diagrammatically by way of example.

In the drawings:

Fig. 1 is a section on the line A—B in Fig. 2, while

Fig. 2 is a front elevation.

Fig. 3 is a section on the line A—B in Fig. 2, however with the supplement removed.

Fig. 5 is an end view thereof, while

Figure 4:
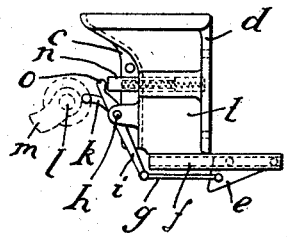
Fig. 4 is a side elevation of this supplementary element.

Referring to the drawings, the lathe as shown in Fig. 1, is altogether "open" at $a$, on that side of the bed $s$ where the cuttings are formed. As shown in Fig. 1, by fitting on the auxiliary wall body $t$ shown more particularly in Figs. 4 and 5, a shaft $b$ (Fig. 1) is formed to guide the cuttings.

Figure 5:
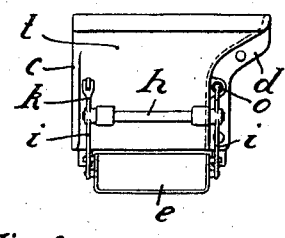
Figure 6:
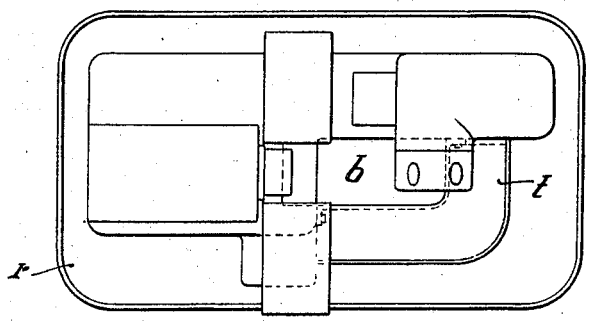
Fig. 6 is a plan view of the lathe.

The part $t$ may be fitted to the lathe by means of flanges $c$ and $d$ (Fig. 5) and bolts provided for this purpose. It is preferably combined with a workpiece chute ($e$) and with means for operating this chute, which, as shown more particularly in Fig. 1, is guided on both sides in rails $f$ fixed to the supplementing element $t$. The chute $e$ is operated by means of two connecting rods $g$ and double armed levers $i$ rigidly connected by a shaft $h$ (Figs. 2 and 5) on the left hand end of which is mounted an arm $k$ carrying a roller, which is controlled in a well known manner by a cam disk $m$ (Figs. 1 and 4) fixed to the cam shaft $l$. The chute $e$ is returned into its rear position by a spring-acted bolt $n$, which acts on the lever arm $o$ on the right hand side (Fig. 4). Preferably the parts are so arranged that on the device $t$ being fitted on the lathe, the lever $k$ directly contacts with the cam disk $m$.

As shown in Fig. 1, where the auxiliary device $t$ is fitted on, the cuttings are guided through the shaft formed by the walls of the bed $s$ and the device $t$. A belt conveyor $p$ (Fig. 1) may be placed in the trough to continuously carry away the cuttings. Whenever a finished workpiece is cut off and drops down, the cam disk $m$, the lever $i$ and connecting rod $g$ carry the chute $e$ below the shaft b, thereby preventing the workpiece from dropping into the heap of cuttings and conduct it into a separate workpiece box q, which is placed in the trough r for ready removal.

I wish it to be understood that I do not desire to be limited to the exact details of construction shown and described for obvious modifications will occur to a person skilled in the art.

I claim:

1. The combination, with an automatic one-spindle lathe, of a substantially vertically extending wall forming an open bed and a separate wall body spaced from and extending substantially in parallel to said wall, said wall body being arranged for ready mounting and dismounting on the lathe and, when mounted thereon, forming, together with said wall, a substantially vertically extending shaft adapted to guide the cuttings and workpieces.

2. The combination of claim 1, in which the separate wall body forms the carrier of a movable workpiece chute and the means for operating same.

KARL TESSKY.